United States Patent Office 3,389,155
Patented June 18, 1968

3,389,155
POLYHYDROXYANDROST-7-ENES AND PROCESSES FOR THEIR PREPARATION
John H. Fried, Palo Alto, Calif., assignor to Syntex Corporation, Panama, Panama, a corporation of Panama
No Drawing. Filed July 22, 1966, Ser. No. 567,045
13 Claims. (Cl. 260—397.45)

ABSTRACT OF THE DISCLOSURE

5($\alpha$ and $\beta$)androst-7-ene derivatives, substituted at C-2$\beta$ and C-3$\beta$ with hydroxy or with an acetal or ketal group bridging the C-2$\beta$,3$\beta$ position, substituted at C-6 with keto or with hydroxy either in the $\alpha$ or $\beta$ position, substituted at C-17 with keto or with hydroxy or the esters thereof in the $\beta$ position and optionally with alkyl, alkenyl or alkynyl in the $\alpha$ position, and optionally substituted at C-14$\alpha$ with hydroxy, are anabolic agents and are also antagonistic agents to the actions of certain natural hormones, e.g. ecdysone.

The present invention relates to novel steriods and to processes for their preparation.

In particular, this invention relates to polyhydroxyandrost-7-enes and to methods for the preparation of such compounds.

The compounds of the present invention may be represented by the following general formula:

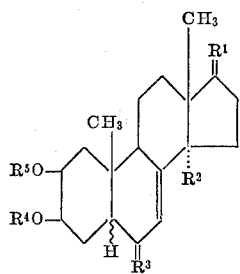

wherein R¹ is oxo or the group

in which R⁶ is hydrogen or a hydrocarbon carboxylic acyl group and R⁷ is hydrogen, lower alkyl, lower alkenyl or lower alkynyl;

R² is hydrogen or hydroxy;
R³ is oxo or (hydrogen, hydroxy); and
each of R⁴ and R⁵ is hydrogen, or taken together the group

in which each of A and B is hydrogen or lower alkyl.

In the context of the present specification and claims, the wavy line "$\}$" embraces the $\alpha$ and $\beta$ configurations, both collectively and singularly, and the compounds of both configurations are included in the present invention.

By the term "lower alkyl," and derivations thereof such as "lower alkenyl" and "lower alkynyl," is meant a branched or straight hydrocarbon chain of up to and including 6 carbon atoms. Thus, included within the term lower alkyl are such groups as methyl, ethyl, propyl, butyl, pentyl, hexyl, and the like; within the term lower alkenyl are such groups as vinyl, propenyl, and the like; and within the term lower alkynyl are such groups as ethynyl, propynyl, and the like.

The hydrocarbon carboxylic acyl and acyloxy groups of the compounds of the present invention contain less than 12 carbon atoms and are of a straight, branched, cyclic or cyclic-aliphatic chain structure. This structure may be saturated, unsaturated or aromatic, and optionally substituted by functional groups such as hydroxy, alkoxy containing up to 5 carbon atoms, acyloxy containing up to 12 carbon atoms, nitro, amino, halogeno, and the like. Typical esters thus include: acetate, propionate, enanthate, benzoate, trimethylacetate, t-butylacetate, phenoxyacetate, cyclopentylpropionate, aminoacetate, $\beta$-chloropropionate, adamontoate, and the like.

The compounds of the present invention exhibit growth-promoting activity and are useful in eliciting an anabolic response in animal species. These compounds are also antagonistic to the action of certain naturally occurring hormones, as for example the insect hormone ecdysone, and can be used to effect a disruption in the normal metamorphic development of insect populations.

The compounds of the present invention may be prepared from polyhydroxypregn-7-enes. According to the present invention, a polyhydroxypregn-7-en-20-one, obtained for example according to the procedures described in copending application Ser. No. 567,042 filed July 22, 1966, is treated with oxygen in the presence of base, such as for example potassium t-butoxide, to yield the corresponding 17$\alpha$-hydroperoxide. Further treatment with base causes spontaneous cleavage of the pregnane side chain, thus generating the corresponding 17-ketoandrost-7-ene. Reduction of this 17-ketoandrost-7-ene as with sodium borohydride, lithium aluminum hydride, or the like then yields the corresponding 17$\beta$-hydroxy compound. These reactions may be represented as follows:

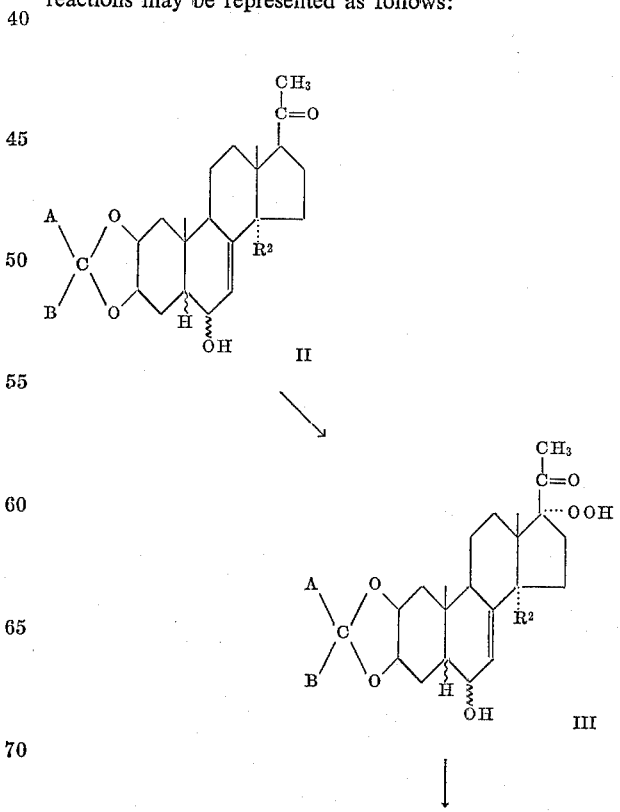

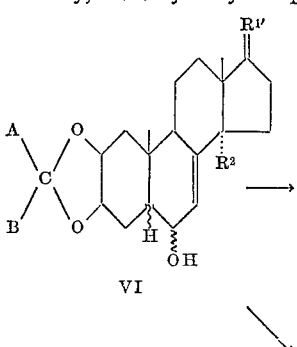
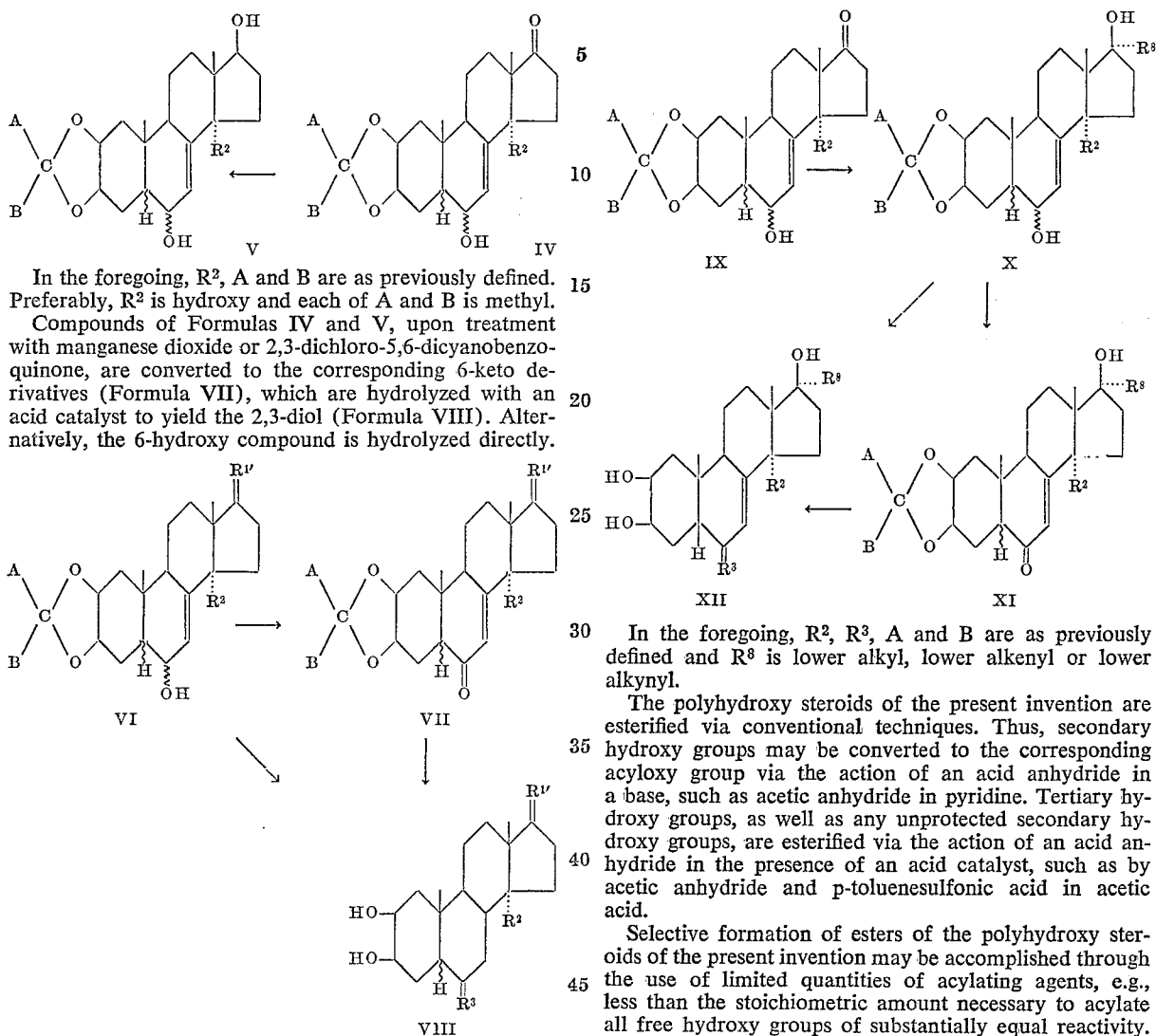

In the foregoing, $R^2$, A and B are as previously defined. Preferably, $R^2$ is hydroxy and each of A and B is methyl.

Compounds of Formulas IV and V, upon treatment with manganese dioxide or 2,3-dichloro-5,6-dicyanobenzoquinone, are converted to the corresponding 6-keto derivatives (Formula VII), which are hydrolyzed with an acid catalyst to yield the 2,3-diol (Formula VIII). Alternatively, the 6-hydroxy compound is hydrolyzed directly.

In the foregoing, $R^2$, $R^3$, A and B are as previously defined and $R^1$ is oxo or

Compounds bearing a substituent in the 17α-position other than hydrogen are prepared from 6-hydroxy-17-keto compounds of Formula IV. Thus, treatment with an alkyl magnesium halide or an alkali metal alkyne yields the correspondingly substituted 17α-alkyl or 17α-alkynyl derivatives, respectively (Formula IX). Typical of these is the preparation of 17α-methyl and 17α-ethynyl derivatives through treatment of the 17-keto intermediate with methyl magnesium bromide and lithium acetylide, respectively. Preparation of 17α-alkenyl derivatives such as vinyl is realized either through the use of analogous organometallic reagents or through the controlled catalytic hydrogenation of the corresponding alkynyl derivative, as with 2% palladium-on-calcium carbonate. Further catalytic hydrogenation of these alkynyl intermediates provides an alternative route to the 17α-lower alkyl derivatives.

Formation of 6-keto-17α-substituted androst-7-enes of the present invention (Formula X) is realized in the fashion hereinabove described with manganese dioxide or 2,3-dichloro-5,6-dicyanobenzoquinone. Likewise, the 2β,3β-dihydroxy-17α-substituted derivatives (Formula XI) of the present invention are prepared via hydrolysis of the 2β,3β-alkylidenedioxy steroids, as with a proton donor such as hydrochloric acid.

In the foregoing, $R^2$, $R^3$, A and B are as previously defined and $R^8$ is lower alkyl, lower alkenyl or lower alkynyl.

The polyhydroxy steroids of the present invention are esterified via conventional techniques. Thus, secondary hydroxy groups may be converted to the corresponding acyloxy group via the action of an acid anhydride in a base, such as acetic anhydride in pyridine. Tertiary hydroxy groups, as well as any unprotected secondary hydroxy groups, are esterified via the action of an acid anhydride in the presence of an acid catalyst, such as by acetic anhydride and p-toluenesulfonic acid in acetic acid.

Selective formation of esters of the polyhydroxy steroids of the present invention may be accomplished through the use of limited quantities of acylating agents, e.g., less than the stoichiometric amount necessary to acylate all free hydroxy groups of substantially equal reactivity. Generally, mixtures of partially esterified products are thus obtained, and this is separated into its various components via conventional techniques, such as chromatography, fractional crystallization, or the like. Moreover, by utilizing compounds wherein hydroxy groups are either protected, as for example through formation of an ether or alkylidenedioxy group or converted to a non-esterifiable group such as keto, and regeneration of the hydroxy groups after esterification as through acid hydrolysis of the ether or alkylidenedioxy groups or reduction of the keto groups, selective formation of partial esters is realized.

Particularly preferred compounds of the present invention are those of the formula:

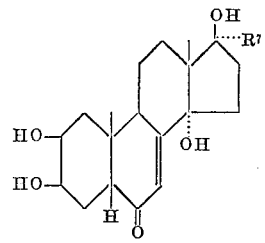

wherein $R^7$ is hydrogen; lower alkyl, preferably methyl and ethyl; lower alkenyl, preferably vinyl; or lower alkynyl, preferably ethynyl.

The following examples will serve to further typify the nature of this invention, but as these are presented solely to illustrate typical embodiments of the invention, they should not be construed as limitations thereof.

EXAMPLE 1

To 1 g. of $2\beta,3\beta$-isopropylidenedioxy-6,14$\alpha$-dihydroxy-5$\beta$-pregn-7-en-20-one in 20 ml. of t-butanol and 20 ml. of dioxane are added, at 5° C. to 7° C., 2.2 g. of potassium t-butoxide. Oxygen is then introduced until one equivalent has been added. The mixture is then flushed by bubbling nitrogen through the solution, and the mixture is then heated at from about 40° C. to about 60° C. for 20 minutes under nitrogen. The mixture is then poured into 300 ml. of water and is extracted with ethyl acetate. These extracts are dried over sodium sulfate and chromatographed on alumina to yield $2\beta,3\beta$-isopropylidenedioxy-6,14$\alpha$-dihydroxy-5$\beta$-androst-7-en-17-one.

In a similar fashion, there are obtained from the corresponding starting materials: $2\beta,3\beta$-isopropylidene-6,14$\alpha$-dihydroxy - 5$\alpha$ - androst - 7 - en - 17 - one; $2\beta,3\beta$-isopropylidene - 6 - hydroxy - 5$\beta$ - androst - 7 en - 17 - one; and $2\beta,3\beta$ - isopropylidene - 6 - hydroxy - 5$\alpha$ - androst - 7 - en-17-one.

The mixture of the 6$\alpha$ and 6$\beta$-hydroxy isomers for each of the above products is used as such or is separated at this or a later stage through conventional techniques such as chromatography. The individual isomers may also be used in the above procedure.

EXAMPLE 2

A solution of 1 g. of sodium borohydride in 3 ml. of water is added to an ice-cooled solution of 1 g. of $2\beta,3\beta$-isopropylidenedioxy - 6,14$\alpha$ - dihydroxy-5$\beta$-androst-7-en-17-one in 120 ml. of methanol, and the mixture is then allowed to stand for 16 hours at room temperature. The excess reagent is decomposed by addition of acetic acid and the solution is then concentrated to small volume in vacuo and diluted with water. The product is extracted with ethyl acetate, and these extracts are washed with water, dried and evaporated to yield $2\beta,3\beta$-isopropylidenedioxy-6,14$\alpha$,17$\beta$-trihydroxy-5$\beta$-androst-7-ene, which may be further purified by recrystallization from acetone: hexane.

Utilizing the appropriate 17-keto derivatives, there are similarly obtained: $2\beta,3\beta$-isopropylidenedioxy-6,14$\alpha$,17$\beta$-trihydroxy-5$\alpha$-androst-7-ene; $2\beta,3\beta$-isopropylidenedioxy-6, 17$\beta$ - dihydroxy-5$\beta$-androst-7-ene; and $2\beta,3\beta$-isopropylidenedioxy-6,17$\beta$-dihydroxy-5$\alpha$-androst-7-ene.

EXAMPLE 3

A solution of 5 g. of $2\beta,3\beta$-isopropylidenedioxy-6,14$\alpha$-dihydroxy-5$\beta$-androst-7-en-17-one in 250 ml. of thiophene-free benzene is treated with 27.5 ml. of 4 N methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate, and these extracts are in turn washed with water, dried over sodium sulfate and evaporated to dryness to yield $2\beta,3\beta$-isopropylidenedioxy-6,14$\alpha$,17$\beta$-trihydroxy-17$\alpha$-methyl-5$\beta$-androst-7-ene, which is recrystallized from methylene chloride:hexane.

Similarly prepared are: $2\beta,3\beta$-isopropylidenedioxy-6, 14$\alpha$,17$\beta$ - trihydroxy-17$\alpha$-methyl-5$\alpha$-androst-7-ene; $2\beta,3\beta$-isopropylidenedioxy - 6,17$\beta$-dihydroxy-17$\alpha$-methyl-5$\beta$-androst-7-ene; and $2\beta,3\beta$ - isopropylidenedioxy-6,17$\beta$-dihydroxy-5$\alpha$-androst-7-ene.

EXAMPLE 4

A solution of 1 g. of $2\beta,3\beta$-isopropylidenedioxy-6,14$\alpha$-dihydroxy-5$\beta$-androst-7-en-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane: benzene yields $2\beta,3\beta$-isopropylidenedioxy-6,14$\alpha$,17$\beta$-trihydroxy-17$\alpha$-ethynyl-5$\beta$-androst-7-ene, which is recrystallized from acetone:hexane.

There are similarly obtained according to the foregoing procedure: $2\beta,3\beta$ - isopropylidenedioxy-6,14$\alpha$,17$\beta$-trihydroxy - 17$\alpha$-ethynyl-5$\alpha$-androst-7-ene; $2\beta,3\beta$-isopropylidenedioxy - 6,17$\beta$ - dihydroxy-17$\alpha$-ethynyl-5$\beta$-androst-7-ene; and $2\beta,3\beta$ - isopropylidenedioxy-6,17$\beta$-dihydroxy-17$\alpha$-ethynyl-5$\alpha$-androst-7-ene.

EXAMPLE 5

A solution of 1 g. of $2\beta,3\beta$-isopropylidenedioxy-6,14$\alpha$, 17$\beta$-trihydroxy-17$\alpha$-ethynyl-5$\beta$-androst-7-ene in 40 ml. of pyridine is hydrogenated at 25° C. atmospheric pressure in the presence of 0.4 g. of Lindlar catalyst. When 1.1 molar equivalents of hydrogen are absorbed, the reaction is stopped. The catalyst is removed by filtration through Celite diatomaceous earth and washed with ethyl acetate, and the combined filtrate and washings are evaporated to dryness under reduced pressure. The residue is dissolved in ethyl acetate, and this solution is then washed with dilute hydrochloric acid and water to neutrality, dried and evaporated to dryness to yield $2\beta,3\beta$-isopropylidenedioxy-6,14$\alpha$,17$\beta$-trihydroxy-17$\alpha$-vinyl - 5$\beta$ - androst-7-ene, which is further purified through recrystallization from acetone.

Similarly prepared are: $2\beta,3\beta$-isopropylidenedioxy-6, 14$\alpha$,17$\beta$ - trihydroxy - 17$\alpha$-vinyl-5$\alpha$-androst-7-ene; $2\beta,3\beta$-isopropylidenedioxy - 6,17$\beta$ - dihydroxy-17$\alpha$-vinyl-5$\beta$-androst-7-ene; and $2\beta,3\beta$ - isopropylidenedioxy-6,17$\beta$-dihydroxy-17$\alpha$-vinyl-5$\alpha$-androst-7-ene.

EXAMPLE 6

A solution of 3 g. of $2\beta,3\beta$-isopropylidenedioxy-6,14$\alpha$, 17$\beta$ - trihydroxy-17$\alpha$-ethynyl-5$\beta$-androst-7-ene in 125 ml. of dioxane is hydrogenated at 25° C./570 mm. with 0.5 g. of prehydrogenated 10% palladium-on-charcoal. Upon the consumption of the theoretical amount of hydrogen, the solution is filtered and the filtrate is evaporated to dryness under reduced pressure to yield $2\beta,3\beta$-isopropylidenedioxy - 6,14$\alpha$,17$\beta$ - trihydroxy-17$\alpha$-ethyl-5$\beta$-androst-7-ene, which is recrystallized from acetone.

Prepared in the identical fashion from the corresponding starting materials are: $2\beta,3\beta$-isopropylidenedioxy-6, 14$\alpha$,17$\beta$ - trihydroxy-17$\alpha$-ethyl-5$\alpha$-androst-7-ene; $2\beta,3\beta$-isopropylidenedioxy - 6,17$\beta$ - dihydroxy-17$\alpha$-ethyl-5$\beta$-androst-7-ene; and $2\beta,3\beta$ - isopropylidenedioxy-6,17$\beta$-dihydroxy-5$\alpha$-androst-7-ene.

Alternatively, the foregoing compounds may be prepared via the following procedure.

To a stirred solution of 2 g. of $2\beta,3\beta$-isopropylidenedioxy - 6,14$\alpha$ - dihydroxy-5$\beta$-androst-7-en-17-one in 250 ml. of absolute ether is added in a dropwise fashion under nitrogen, an ethereal solution of 10 molar equivalents of ethyl lithium. The mixture is then stirred for 48 hours at room temperature, poured into water, acidified with hydrochloric acid and stirred vigorously for 1 hour. The ethereal phase is separated, washed with water to neutrality, dried over sodium sulfate and evaporated to dryness to yield $2\beta,3\beta$-isopropylidenedioxy-6,14$\alpha$,17$\beta$-trihydroxy-17$\alpha$-ethyl-5$\beta$-androst-7-ene, which is further purified through recrystallization from acetone:hexane.

EXAMPLE 7

One gram of $2\beta,3\beta$-isopropylidenedioxy-6,14$\alpha$-dihydroxy-5$\beta$-androst-7-en-17-one in 100 ml. of chloroform, which has been distilled over calcium chloride, is stirred for 18 hours at room temperature with 10 g. of freshly precipitated manganese dioxide. The inorganic material is then removed by filtration and washed with hot chloroform, and the combined filtrate and washings are evaporated to yield 2β,3β-isopropylidenedioxy-14α-hydroxy-5β-androst-7-ene-6,17-dione, which may be further purified through recrystallization from acetone:hexane.

Alternatively, the following procedure may be employed. A mixture of 1 g. of 2β,3β-isopropylidenedioxy-6,14α-dihydroxy-5α-androst-7-en-17-one in 20 ml. of dioxane and 1.1 molar equivalents of 2,3-dichloro-5,6-dicyano-1,3-benzoquinone is allowed to stand at room temperature for 3 hours. The solid formed during the reaction is removed by filtration and the filtrate is evaporated to dryness. The residue is dissolved in acetone and filtered through 20 g. of alumina to yield 2β,3β-isopropylidenedioxy-14α-hydroxy-5-α-androst-7-ene-6,17-dione, which may be further purified by recrystallization from acetone:hexane.

By utilizing either of the above procedures with the appropriate 6-hydroxy intermediate, the following derivatives are obtained:

2β,3β-isopropylidenedioxy-5β-androst-7-ene-6,17-dione;
2β,3β-isopropylidenedioxy-5α-androst-7-ene-6,17-dione;
2β,3β-isopropylidenedioxy-14α,17β-dihydroxy-5β-androst-7-en-6-one;
2β,3β-isopropylidenedioxy-14α,17β-dihydroxy-5α-androst-7-en-6-one;
2β,3β-isopropylidenedioxy-17β-hydroxy-5β-androst-7-en-6-one;
2β,3β-isopropylidenedioxy-17β-hydroxy-5α-androst-7-en-6-one;
2β,3β-isopropylidenedioxy-14α,17β-dihydroxy-17α-methyl-5β-androst-7-en-6-one;
2β,3β-isopropylidenedioxy-14α,17β-dihydroxy-17α-methyl-5α-androst-7-en-6-one;
2β,3β-isopropylidenedioxy-17β-hydroxy-17α-methyl-5β-androst-7-en-6-one;
2β,3β-isopropylidenedioxy-17β-hydroxy-17α-methyl-5α-androst-7-en-6-one;
2β,3β-isopropylidenedioxy-14α,17β-dihydroxy-17α-ethynyl-5β-androst-7-en-6-one;
2β,3β-isopropylidenedioxy-14α,17β-dihydroxy-17α-ethynyl-5α-androst-7-en-6-one;
2β,3β-isopropylidenedioxy-17β-hydroxy-17α-ethynyl-5β-androst-7-en-6-one;
2β,3β-isopropylidenedioxy-17β-hydroxy-17α-ethynyl-5α-androst-7-en-6-one;
2β,3β-isopropylidenedioxy-14α,17β-dihydroxy-17α-vinyl-5β-androst-7-en-6-one;
2β,3β-isopropylidenedioxy-14α,17β-dihydroxy-17α-vinyl-5α-androst-7-en-6-one;
2β,3β-isopropylidenedioxy-17β-hydroxy-17α-vinyl-5β-androst-7-en-6-one;
2β,3β-isopropylidenedioxy-17β-hydroxy-17α-vinyl-5α-androst-7-en-6-one;
2β,3β-isopropylidenedioxy-14α,17β-dihydroxy-17α-ethyl-5β-androst-7-en-6-one;
2β,3β-isopropylidenedioxy-14α,17β-dihydroxy-17α-ethyl-5α-androst-7-en-6-one;
2β,3β-isopropylidenedioxy-17β-hydroxy-17α-ethyl-5β-androst-7-en-6-one; and
2β,3β-isopropylidenedioxy-17β-hydroxy-17α-ethyl-5α-androst-7-en-6-one.

EXAMPLE 8

A mixture of 1 g. of 2β,3β-isopropylidenedioxy-14α-hydroxy-5β-androst-7-en-6,17-dione, 90 ml. of 80% aqueous tetrahydrofuran, and 9 ml. of 1 N hydrochloric acid is allowed to stand at room temperature for about 3 hours. The reaction mixture is then washed with aqueous potassium bicarbonate solution to neutrality and extracted with ethyl acetate. These extracts are washed with water, dried over sodium sulfate, and concentrated to dryness to yield 2β,3β,14α-trihydroxy-5β-androst-7-ene-6,17-dione, which may be further purified through chromatography on silica, eluting with 9:1 chloroform:methanol.

In a similar fashion, the following 2β,3β-diols are obtained from the corresponding 2β,3β-isopropylidenedioxy derivatives:

2β,3β,14α-trihydroxy-5α-androst-7-ene-6,17-dione;
2β,3β-dihydroxy-5β-androst-7-ene-6,17-dione;
2β,3β-dihydroxy-5α-androst-7-ene-6,17-dione;
2β,3β,14α,17β-tetrahydroxy-5β-androst-7-en-6-one;
2β,3β,14α,17β-tetrahydroxy-5α-androst-7-en-6-one;
2β,3β,17β-trihydroxy-5β-androst-7-en-6-one;
2β,3β,17β-trihydroxy-5α-androst-7-en-6-one;
2β,3β,14α,17β-tetrahydroxy-17α-methyl-5β-androst-7-en-6-one;
2β,3β,14α,17β-tetrahydroxy-17α-methyl-5α-androst-7-en-6-one;
2β,3β,14α,17β-tetrahydroxy-17α-ethynyl-5β-androst-7-en-6-one;
2β,3β,14α,17β-tetrahydroxy-17α-ethynyl-5α-androst-7-en-6-one;
2β,3β,14α,17β-tetrahydroxy-17α-vinyl-5β-androst-7-en-6-one;
2β,3β,14α,17β-tetrahydroxy-17α-vinyl-5α-androst-7-en-6-one;
2β,3β,14α,17β-tetrahydroxy-17α-ethyl-5β-androst-7-en-6-one;
2β,3β,14α,17β-tetrahydroxy-17α-ethyl-5α-androst-7-en-6-one;
2β,3β,17β-trihydroxy-17α-methyl-5β-androst-7-en-6-one;
2β,3β,17β-trihydroxy-17α-methyl-5α-androst-7-en-6-one;
2β,3β,17β-trihydroxy-17α-ethynyl-5β-androst-7-en-6-one;
2β,3β,17β-trihydroxy-17α-ethynyl-5α-androst-7-en-6-one;
2β,3β,17β-trihydroxy-17α-vinyl-5β-androst-7-en-6-one;
2β,3β,17β-trihydroxy-17α-vinyl-5α-androst-7-en-6-one;
2β,3β,17β-trihydroxy-17α-ethyl-5β-androst-7-en-6-one;
2β,3β,17β-trihydroxy-17α-ethyl-5α-androst-7-en-6-one;
2β,3β,6,14α-tetrahydroxy-5β-androst-7-en-17-one;
2β,3β,6,14α-tetrahydroxy-5α-androst-7-en-17-one;
2β,3β,6-trihydroxy-5β-androst-7-en-17-one;
2β,3β-6-trihydroxy-5α-androst-7-en-17-one;
2β,3β,6,14α,17β-pentahydroxy-5β-androst-7-ene;
2β,3β,6,14α,17β-pentahydroxy-5α-androst-7-ene;
2β,3β,6,17β-tetrahydroxy-5β-androst-7-ene;
2β,3β,6,17β-tetrahydroxy-5α-androst-7-ene;
2β,3β,6,14α,17β-pentahydroxy-17α-methyl-5β-androst-7-ene;
2β,3β,6,14α,17β-pentahydroxy-17α-methyl-5α-androst-7-ene;
2β,3β,6,14α,17β-pentahydroxy-17α-ethynyl-5β-androst-7-ene;
2β,3β,6,14α,17β-pentahydroxy-17α-ethynyl-5α-androst-7-ene;
2β,3β,6,14α,17β-pentahydroxy-17α-vinyl-5β-androst-7-ene;
2β,3β,6,14α,17β-pentahydroxy-17α-vinyl-5α-androst-7-ene;
2β,3β,6,14α,17β-pentahydroxy-17α-ethyl-5β-androst-7-ene;
2β,3β,6,14α,17β-pentahydroxy-17α-ethyl-5α-androst-7-ene;
2β,3β,6,17β-tetrahydroxy-17α-methyl-5β-androst-7-ene;
2β,3β,6,17β-tetrahydroxy-17α-methyl-5α-androst-7-ene;
2β,3β,6,17β-tetrahydroxy-17α-ethynyl-5β-androst-7-ene;
2β,3β,6,17β-tetrahydroxy-17α-ethynyl-5α-androst-7-ene;
2β,3β,6,17β-tetrahydroxy-17α-vinyl-5β-androst-7-ene;
2β,3β,6,17β-tetrahydroxy-17α-vinyl-5α-androst-7-ene;
2β,3β,6,17β-tetrahydroxy-17α-ethyl-5β-androst-7-ene; and
2β,3β,6,17β-tetrahydroxy-17α-ethyl-5α-androst-7-ene.

What is claimed is:
1. Compounds of the formula:

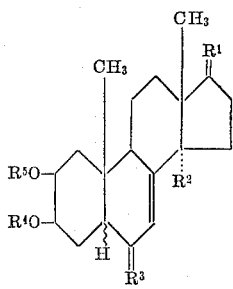

wherein $R^1$ is oxo or

in which $R^6$ is hydrogen or a hydrocarbon carboxylic acyl group and $R^7$ is hydrogen, lower alkyl, lower alkenyl or lower alkynyl;

$R^2$ is hydrogen or hydroxy;

$R^3$ is oxo or (hydrogen, hydroxy); and each of $R^4$ and $R^5$ is hydrogen, or taken together the group:

in which each of A and B is hydrogen or lower alkyl.

2. Compounds according to claim 1 wherein $R^1$ is oxo.
3. Compounds according to claim 1 wherein $R^7$ is hydrogen.
4. Compounds according to claim 1 wherein $R^7$ is lower alkyl.
5. Compounds according to claim 1 wherein $R^7$ is lower alkenyl.
6. Compounds according to claim 1 wherein $R^7$ is lower alkynyl.
7. Compounds according to claim 1 wherein $R^1$ is as therein defined, $R^2$ is hydroxy, $R^3$ is oxo, $R^4$ and $R^5$ are both hydrogen, and the hydrogen in the 5-position is of the $\beta$-configuration.
8. The compound according to claim 7 wherein $R^1$ is oxo.
9. The compound according to claim 7 wherein $R^6$ and $R^7$ are each hydrogen.
10. The compound according to claim 7 wherein $R^6$ is hydrogen and $R^7$ is methyl.
11. The compound according to claim 7 wherein $R^6$ is hydrogen and $R^7$ is ethyl.
12. The compound according to claim 7 wherein $R^6$ is hydrogen and $R^7$ is vinyl.
13. The compound according to claim 7 wherein $R^6$ is hydrogen and $R^7$ is ethynyl.

No references cited.

ELBERT L. ROBERTS, *Primary Examiner.*